US00RE46104E

(19) United States
(12) Reissued Patent
Preisler et al.

(10) Patent Number: US RE46,104 E
(45) Date of Reissued Patent: Aug. 16, 2016

(54) METHOD OF MAKING A SANDWICH-TYPE COMPOSITE PANEL HAVING A LIVING HINGE AND PANEL OBTAINED BY PERFORMING THE METHOD

(71) Applicant: GLOBAL IP HOLDINGS, LLC, Sterling Heights, MI (US)

(72) Inventors: Darius J. Preisler, Macomb, MI (US); Christopher A. Heikkila, Washington Township, MI (US)

(73) Assignee: GLOBAL IP HOLDINGS, LLC, Sterling Heights, MI (US)

(21) Appl. No.: 14/632,255

(22) Filed: Feb. 26, 2015

Related U.S. Patent Documents

Reissue of:

(64) Patent No.: 8,795,465
Issued: Aug. 5, 2014
Appl. No.: 13/453,269
Filed: Apr. 23, 2012

(51) Int. Cl.
*B32B 3/02* (2006.01)
*C09J 5/00* (2006.01)
(Continued)

(52) U.S. Cl.
CPC ..... *B32B 5/245* (2013.01); *B29C 51/145* (2013.01); *B29C 59/007* (2013.01); *B32B 3/12* (2013.01); *B32B 3/28* (2013.01); *B32B 5/022* (2013.01); *B32B 27/065* (2013.01); *B32B 27/08* (2013.01); *B32B 27/12* (2013.01); *E04B 2/58* (2013.01); *B29L 2031/22* (2013.01); *B32B 2250/40* (2013.01)
(Continued)

(58) Field of Classification Search
CPC ..... B32B 3/00; B32B 3/12; B32B 3/28; B32B 5/00; B32B 27/06; B32B 27/08; B32B 27/32; B32B 37/1027; B32B 37/146; B32B 37/185; B32B 5/245; B32B 27/065; B32B 27/12; B32B 5/022; B32B 2250/40; E04B 2/58; B29C 51/145; B29C 59/007; B29L 2031/22
USPC ..... 156/60, 324; 428/304.4; 442/409
See application file for complete search history.

(56) References Cited

U.S. PATENT DOCUMENTS 3,651,563 A 3/1972 Volkmann
3,750,525 A 8/1973 Waters et al.
(Continued)

FOREIGN PATENT DOCUMENTS

DE 19612127 A1 * 10/1997 ..... B29C 65/02

OTHER PUBLICATIONS

English translation of DE 19612127 A1.*
(Continued)

*Primary Examiner* — Norca L Torres Velazquez
(74) *Attorney, Agent, or Firm* — Brooks Kushman P.C.

(57) ABSTRACT

A method of making a sandwich-type composite panel having a living hinge from a stack of material is provided. The stack includes first and second reinforced thermoplastic skins heated to a softening temperature and a thermoplastic cellular core disposed between the skins. The first skin is stretchable when heated to the softening temperature. A pressure is applied to the stack after the step of heating to form the composite panel. A portion of the composite panel is crushed at a predetermined location simultaneously with the step of applying to locally compact and separate the cellular core at the predetermined location to form two side portions of the panel and a crushed portion of the panel between the two side portions. The first skin stretches during the step of crushing while remaining intact between the two side portions. The skins bond together at the predetermined location to form the living hinge.

18 Claims, 6 Drawing Sheets

(51) Int. Cl.

| | |
|---|---|
| ***B32B 5/24*** | (2006.01) |
| ***E04B 2/58*** | (2006.01) |
| ***B32B 3/28*** | (2006.01) |
| ***B29C 51/14*** | (2006.01) |
| ***B32B 27/06*** | (2006.01) |
| ***B32B 27/08*** | (2006.01) |
| ***B32B 27/12*** | (2006.01) |
| ***B32B 3/12*** | (2006.01) |
| ***B29C 59/00*** | (2006.01) |
| ***B32B 5/02*** | (2006.01) |
| *B29L 31/22* | (2006.01) |

(56) References Cited

U.S. PATENT DOCUMENTS

| | | | |
|---|---|---|---|
| 4,717,612 | A | 1/1988 | Shackelford |
| 5,026,445 | A | 6/1991 | Mainolfi et al. |
| 5,074,726 | A | 12/1991 | Betchel et al. |
| 5,253,962 | A | 10/1993 | Close, Jr. |
| 5,298,694 | A | 3/1994 | Thompson et al. |
| 5,316,604 | A | 5/1994 | Fell |
| 5,370,521 | A | 12/1994 | McDougall |
| 5,423,933 | A | 6/1995 | Horian |
| 5,502,930 | A | 4/1996 | Burkette et al. |
| 5,534,097 | A | 7/1996 | Fasano et al. |
| 5,683,782 | A | 11/1997 | Duchene |
| 5,744,210 | A | 4/1998 | Hofmann et al. |
| 5,750,160 | A | 5/1998 | Weber et al. |
| 5,915,445 | A | 6/1999 | Rauenbusch |
| 5,979,962 | A | 11/1999 | Valentin et al. |
| 6,050,630 | A | 4/2000 | Hochet |
| 6,066,217 | A | 5/2000 | Dibble et al. |
| 6,102,464 | A | 8/2000 | Schneider et al. |
| 6,102,630 | A | 8/2000 | Flolo |
| 6,435,577 | B1 | 8/2002 | Renault |
| 6,537,413 | B1 | 3/2003 | Hochet et al. |
| 6,615,762 | B1 | 9/2003 | Scott |
| 6,631,785 | B2 | 10/2003 | Khambete et al. |
| 6,655,299 | B2 | 12/2003 | Preisler et al. |
| 6,659,223 | B2 | 12/2003 | Allison et al. |
| 6,682,675 | B1 | 1/2004 | Vandangeot et al. |
| 6,682,676 | B1 | 1/2004 | Renault et al. |
| 6,748,876 | B2 | 6/2004 | Preisler et al. |
| 6,752,443 | B1 | 6/2004 | Thompson et al. |
| 6,790,026 | B2 | 9/2004 | Vandangeot et al. |
| 6,793,747 | B2 | 9/2004 | North et al. |
| 6,823,803 | B2 | 11/2004 | Preisler |
| 6,825,803 | B2 | 11/2004 | Wixforth et al. |
| 6,843,525 | B2 | 1/2005 | Preisler |
| 6,890,023 | B2 | 5/2005 | Preisler et al. |
| 6,905,155 | B1 | 6/2005 | Presley et al. |
| 6,926,348 | B2 | 8/2005 | Krueger et al. |
| 6,945,594 | B1 | 9/2005 | Bejin et al. |
| 6,981,863 | B2 | 1/2006 | Renault et al. |
| 7,014,259 | B2 | 3/2006 | Heholt |
| 7,059,646 | B1 | 6/2006 | DeLong et al. |
| 7,059,815 | B2 | 6/2006 | Ando et al. |
| 7,090,274 | B1 | 8/2006 | Khan et al. |
| 7,093,879 | B2 | 8/2006 | Putt et al. |
| 7,121,601 | B2 | 10/2006 | Mulvihill et al. |
| 7,188,881 | B1 | 3/2007 | Sturt et al. |
| 7,207,616 | B2 | 4/2007 | Sturt |
| 7,222,915 | B2 | 5/2007 | Philippot et al. |
| 7,264,685 | B2 | 9/2007 | Katz et al. |
| 7,316,788 | B2 | 1/2008 | Autrey et al. |
| 7,320,739 | B2 | 1/2008 | Thompson, Jr. et al. |
| 7,402,537 | B1 | 7/2008 | Lenda et al. |
| 7,419,713 | B2 | 9/2008 | Wilkens et al. |
| 7,530,322 | B2 | 5/2009 | Angelini |
| 7,628,440 | B2 | 12/2009 | Bernhardsson et al. |
| 7,713,011 | B2 | 5/2010 | Orszagh et al. |
| 7,837,009 | B2 | 11/2010 | Gross et al. |
| 7,854,211 | B2 | 12/2010 | Rixford |
| 7,909,379 | B2 | 3/2011 | Winget et al. |
| 7,918,313 | B2 | 4/2011 | Gross et al. |
| 7,919,031 | B2 | 4/2011 | Winget et al. |
| 7,942,475 | B2 | 5/2011 | Murray |
| 7,963,243 | B2 | 6/2011 | Quigley |
| 8,069,809 | B2 | 12/2011 | Wagenknecht et al. |
| 8,117,972 | B2 | 2/2012 | Winget et al. |
| 8,133,419 | B2 | 3/2012 | Burks et al. |
| 8,298,675 | B2 | 10/2012 | Alessandro et al. |
| 8,475,884 | B2 | 7/2013 | Kia |
| 8,622,456 | B2 | 1/2014 | Preisler et al. |
| 8,690,233 | B2 | 4/2014 | Preisler et al. |
| 8,764,089 | B2 | 7/2014 | Preisler et al. |
| 8,795,465 | B2 | 8/2014 | Preisler et al. |
| 8,795,807 | B2 | 8/2014 | Preisler et al. |
| 8,808,827 | B2 | 8/2014 | Preisler et al. |
| 8,808,828 | B2 | 8/2014 | Preisler et al. |
| 8,808,829 | B2 | 8/2014 | Preisler et al. |
| 8,808,830 | B2 | 8/2014 | Preisler et al. |
| 8,808,831 | B2 | 8/2014 | Preisler et al. |
| 8,808,833 | B2 | 8/2014 | Preisler et al. |
| 8,808,834 | B2 | 8/2014 | Preisler et al. |
| 8,808,835 | B2 | 8/2014 | Preisler et al. |
| 8,834,985 | B2 | 9/2014 | Preisler et al. |
| 8,852,711 | B2 | 10/2014 | Preisler et al. |
| 8,859,074 | B2 | 10/2014 | Preisler et al. |
| 8,883,285 | B2 | 11/2014 | Preisler et al. |
| 2003/0079659 | A1* | 5/2003 | Preisler et al. ..... 108/51.3 |
| 2004/0078929 | A1 | 4/2004 | Schoemann |
| 2005/0189674 | A1 | 9/2005 | Hochet et al. |
| 2006/0008609 | A1 | 1/2006 | Snyder et al. |
| 2006/0255611 | A1 | 11/2006 | Smith et al. |
| 2007/0065264 | A1 | 3/2007 | Sturt et al. |
| 2007/0069542 | A1 | 3/2007 | Steiger et al. |
| 2007/0256379 | A1 | 11/2007 | Edwards |
| 2007/0258786 | A1 | 11/2007 | Orszagh et al. |
| 2008/0185866 | A1 | 8/2008 | Tarrant et al. |
| 2009/0108639 | A1 | 4/2009 | Sturt et al. |
| 2010/0026031 | A1 | 2/2010 | Jouraku |
| 2010/0086728 | A1 | 4/2010 | Theurl et al. |
| 2010/0206467 | A1 | 8/2010 | Durand et al. |
| 2011/0260359 | A1 | 10/2011 | Durand et al. |
| 2011/0315310 | A1 | 12/2011 | Trevisan et al. |
| 2012/0247654 | A1 | 10/2012 | Piccin et al. |
| 2012/0315429 | A1 | 12/2012 | Stamp et al. |
| 2013/0031752 | A1 | 2/2013 | Davies |
| 2013/0075955 | A1 | 3/2013 | Piccin et al. |
| 2013/0137798 | A1 | 5/2013 | Piccin |
| 2013/0278002 | A1 | 10/2013 | Preisler et al. |
| 2013/0278003 | A1 | 10/2013 | Preisler et al. |
| 2013/0278007 | A1 | 10/2013 | Preisler et al. |
| 2013/0278008 | A1 | 10/2013 | Preisler et al. |
| 2013/0278009 | A1 | 10/2013 | Preisler et al. |
| 2013/0278015 | A1 | 10/2013 | Preisler et al. |
| 2013/0278018 | A1 | 10/2013 | Preisler et al. |
| 2013/0278019 | A1 | 10/2013 | Preisler et al. |
| 2013/0278020 | A1 | 10/2013 | Preisler et al. |
| 2013/0280459 | A1 | 10/2013 | Nakashima et al. |
| 2013/0280469 | A1 | 10/2013 | Preisler et al. |
| 2013/0280472 | A1 | 10/2013 | Preisler et al. |
| 2013/0312652 | A1 | 11/2013 | Preisler et al. |
| 2013/0316123 | A1 | 11/2013 | Preisler et al. |
| 2013/0333837 | A1 | 12/2013 | Preisler et al. |
| 2014/0077518 | A1 | 3/2014 | Preisler et al. |
| 2014/0077530 | A1 | 3/2014 | Preisler et al. |
| 2014/0077531 | A1 | 3/2014 | Preisler et al. |
| 2014/0154461 | A1 | 6/2014 | Preisler et al. |
| 2014/0225296 | A1 | 8/2014 | Preisler et al. |
| 2014/0335303 | A1 | 11/2014 | Preisler et al. |

OTHER PUBLICATIONS

Office Action; Related U.S. Appl. No. 13/479,974; Date of mailing Oct. 15, 2014.

Office Action; related U.S. Appl. No. 13/479,974; date of mailing Mar. 20, 2014.

Office Action; related U.S. Appl. No. 13/686,362; date of mailing Mar. 25, 2014.

Office Action; related U.S. Appl. No. 13/523,253; date of mailing Mar. 25, 2014.

(56) References Cited

OTHER PUBLICATIONS

Office Action; related U.S. Appl. No. 13/688,972; date of mailing Mar. 28, 2014.
Office Action; related U.S. Appl. No. 13/687,232; date of mailing Mar. 28, 2014.
Office Action; related U.S. Appl. No. 13/689,809; date of mailing Mar. 31, 2014.
Office Action; related U.S. Appl. No. 13/687,213; date of mailing Mar. 31, 2014.
Office Action; related U.S. Appl. No. 13/690,265; date of mailing Mar. 31, 2014.
Office Action; related U.S. Appl. No. 13/762,904; date of mailing Apr. 8, 2014.
Office Action; related U.S. Appl. No. 13/762,800; date of mailing Apr. 8, 2014.
Office Action; related U.S. Appl. No. 13/762,861; date of mailing Apr. 9, 2014.
Office Action; related U.S. Appl. No. 13/690,566; date of mailing Apr. 9, 2014.
Office Action; related U.S. Appl. No. 13/762,832; date of mailing Apr. 11, 2014.
Office Action; related U.S. Appl. No. 13/762,921; date of mailing Apr. 14, 2014.
Notice of Allowance; related U.S. Appl. No. 13/686,388; date of mailing Apr. 15, 2014.
Related U.S. Appl. No. 13/690,566, filed Nov. 30, 2012.
Related U.S. Appl. No. 13/762,921, filed Feb. 8, 2013.
Related U.S. Appl. No. 13/762,956, filed Feb. 8, 2013.
Office Action; related U.S. Appl. No. 13/453,201 (now U.S. Pat. No. 8,690,233); date of mailing Nov. 20, 2013.
Office Action; related U.S. Appl. No. 13/523,209 (now U.S. Pat. No. 8,622,456) date of mailing Apr. 29, 2013.
Notice of Allowance and Fee(s) Due; related re-issue U.S. Appl. No. 14/632,247; date mailed: Mar. 1, 2016.
Notice of Allowance and Fee(s) Due; related U.S. Appl. No. 14/087,563; date mailed Mar. 3, 2016.
Office Action, corresponding U.S. Appl. No. 13/687,232, date of mailing Mar. 28, 2014.

* cited by examiner

METHOD OF MAKING A SANDWICH-TYPE COMPOSITE PANEL HAVING A LIVING HINGE AND PANEL OBTAINED BY PERFORMING THE METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

This invention relates, in general, to the field of panels having a sandwich-type composite structure with a cellular core and, in particular, to such panels and methods of making such panels so that the panels have a living hinge.

Overview

Sandwich-type panels having cellular cores have very important characteristics because of their light weight and high strength. Conventionally, such panels are constructed by sandwiching a cellular core having low strength characteristics between two skins, each of which is much thinner than the cellular core but has excellent mechanical characteristics.

The prior art discloses a method of making a panel of sandwich-type composite structure having a cellular core in a single processing step. In that method, the panel is made by subjecting a stack of layers of material to cold-pressing in a mold. As shown in FIG. 1, the stack is made up of: at least a first skin made of a stampable reinforced thermoplastics material, a cellular core made of a thermoplastics material, and a second skin also made of a stampable reinforced thermoplastics material. The stack may also include one or more external covering layers made of a woven or non-woven thermoplastic material. The skins are typically pre-heated outside the mold to a softening temperature.

Such a method is particularly advantageous because of the fact that it makes it possible, in a single operation, to generate cohesion and bonding between the various layers of the composite structure as shown in FIG. 2, and to shape the resulting panel while preserving all of the mechanical properties imparted by the cellular-core sandwich structure.

Panels of sandwich-type composition structure having a cellular core have rigidity characteristics sufficient to enable mechanical structures subjected to large stresses to be reinforced structurally without making them too heavy. Such panels are in common use in shipbuilding, aircraft construction, and rail vehicle construction.

To maximize the functionality of such panels, it is known, in particular, that hinges can be added so that the panels can be hinged to other panels. Such hinges are separate parts that are fixed to the panels by gluing, welding, riveting, or some other fastening technique.

Such hinges are fixed to the sandwich-structure composite panels in a separate and subsequent operation, after said panels have been formed. That subsequent operation requires an additional workstation, be it automated or otherwise, which increases, in particular, the manufacturing time and the manufacturing cost of the finished parts.

In addition, the fact that separate external parts are mounted on a composite panel of the sandwich-type is a source of quality defects, and thus adds to the cost of making such panels.

Published U.S. Patent Application 2005/0189674 discloses a method of making a composite panel of sandwich structure provided with a hinge. The panel includes a stack made up of a first skin of a reinforced thermoplastics material, a cellular core made of a thermoplastics material, and a second skin made of a reinforced thermoplastics material. The panel is formed by pressing the stack in a mold. The first and second skins are preheated to a softening temperature. As shown in FIGS. 3 and 4, after the panel has formed, an incision is made at a determined place in the panel so as to cut through one of the first and second skins, and substantially through the entire thickness of the cellular core, while leaving the other skin intact so that it forms a living hinge between two portions of the incised panel.

Other U.S. patent documents related to the present invention include: U.S. Pat. Nos. 5,502,930; 5,915,445; 6,050,630; 6,102,464; 6,435,577; 6,537,413; 6,655,299; 6,682,675; 6,748,876; 6,790,026; 6,682,676; 6,825,803; 6,843,525; 6,890,023; 6,981,863; 7,090,274; 7,909,379; 7,919,031; 8,117,972; 2006/0255611; and 2008/0185866.

One problem associated with living hinges of the prior art panels is that the panels are quite strong but the living hinges may not be strong enough during extended use. Also, the cost of making such living hinges may be significant on a mass production basis as additional process steps may be required to make the living hinges outside of the mold which makes the panels.

SUMMARY OF EXAMPLE EMBODIMENTS

An object of at least one embodiment of the present invention is to provide a low-cost, high volume method of making light-weight and strong sandwich-type composite panels having living hinges and panels obtained by performing the method wherein the resulting living hinges are strong enough so they function properly during extended use without the need for additional materials or additional post processing steps.

In carrying out the above object and other objects of at least one method embodiment of the invention, a method of making a sandwich-type composite panel having a living hinge is provided. The method includes providing a stack including first and second reinforced thermoplastic skins and a thermoplastic cellular core disposed between the skins. The method also includes heating the skins to a softening temperature wherein the first skin is stretchable when heated to the softening temperature. The method further includes applying a pressure to the stack after the step of heating to form the composite panel. The method still further includes crushing a portion of the composite panel at a predetermined location simultaneously with the step of applying to locally compact and separate the cellular core at the predetermined location to form two side portions of the panel and a crushed portion of the panel between the two side portions. The first skin stretches during the step of crushing while remaining intact between the two side portions. The first and second skins are bonded together at the predetermined location to form the living hinge between the two side portions.

Further in carrying out the above object and other objects of at least one method embodiment of the present invention, a method of making a carpeted sandwich-type composite panel having a living hinge is provided. The method includes providing a stack including first and second reinforced thermoplastic skins, a thermoplastic cellular core disposed between the skins and a thermoplastic covering layer for covering the second skin. The method also includes heating the skins to a softening temperature wherein the first skin is stretchable when heated to the softening temperature. The method further includes applying a pressure to the stack after the step of heating to form the carpeted composite panel. Finally, the method includes crushing a portion of the composite panel at a predetermined location simultaneously with the step of applying to locally compact and separate the cellular core at the predetermined location to form two side portions of the panel and a crushed portion of the panel between the two side portions. The first skin stretches during the step of crushing while remaining intact between the two side portions, The covering layer and the first and second skins at the predetermined location are bonded together to form the living hinge between the two side portions.

The first and second skins may be chemically bonded to each other at the predetermined location to form the living hinge.

The covering layer may be a resin carpet for covering the second skin. The resin may be polypropylene.

The cellular core may be a honeycomb core.

Each or one of the skins may be fiber reinforced.

The thermoplastic of the skins, the carpet and the core may be polypropylene.

The panel may have a thickness in the range of 5 to 25 mm.

The living hinge may have a thickness less than 3 mm, such as 2 mm or less.

At least one of the skins may be a woven skin such as a woven polypropylene skin.

At least one of the skins may be a woven polypropylene skin.

The pressure may lie in a range including $10\times10^5$ Pa to $30\times10^5$ Pa.

Further in carrying out the above object and other objects of at least one carpeted panel embodiment of the present invention, a carpeted panel of a composite-type composite structure is made by performing one of the above-noted methods. The panel includes a stack having a first skin of a reinforced thermoplastic material, a cellular core of a thermoplastic material, a second skin of a reinforced thermoplastic material and a covering layer of a thermoplastics material. The panel also includes a living hinge defined by the crushed portion.

Still further in carrying out the above object and other objects of at least one panel embodiment of the present invention, a panel of sandwich-type composite structure is made by performing another one of the above-noted methods. The panel includes a stack having a first skin of a reinforced thermoplastics material, a cellular core of a thermoplastics material, and a second skin of a reinforced thermoplastics material. The panel also includes a living hinge defined by the crushed portion.

Other technical advantages will be readily apparent to one skilled in the art from the following figures, descriptions and claims. Moreover, while specific advantages have been enumerated, various embodiments may include all, some or none of the enumerated advantages.

BRIEF DESCRIPTION OF THE DRAWINGS

FIGS. 10a-10f are side views, partially broken away and in cross section, of various alternative sizes and shapes for the crushing protrusion of the mold of FIGS. 6-9.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
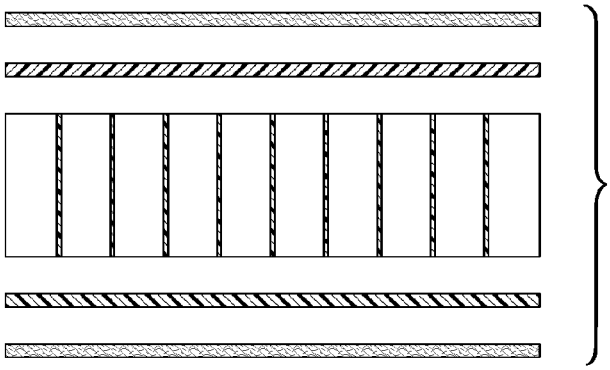
Fig. 1 (PRIOR ART)
FIG. 1 is a side sectional view showing various separate layers of a prior art stack of thermoplastic-based layers of material.
Figure 2:
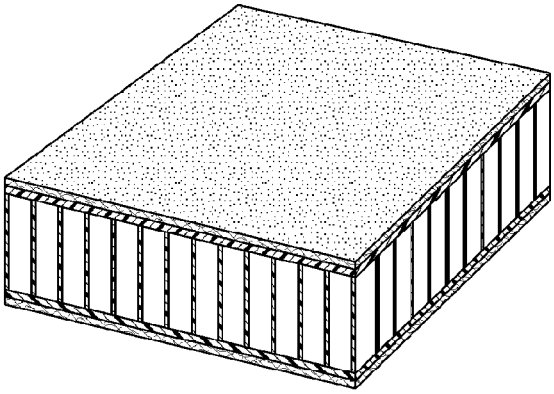
Fig. 2 (PRIOR ART)
FIG. 2 is a top perspective sectional view, of the stack of FIG. 1 after low-pressure, cold compression molding.
Figure 3:
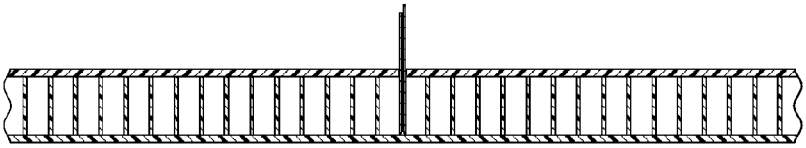
Fig. 3 (PRIOR ART)
FIGS. 3 and 4 are side views, partially broken away and in cross section, of a prior art sandwich-type composite panel having a living hinge and method of making the living hinge.
Figure 4:
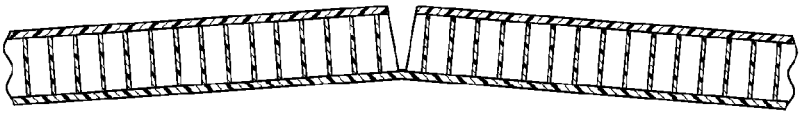
Fig. 4 (PRIOR ART)
Figure 5:
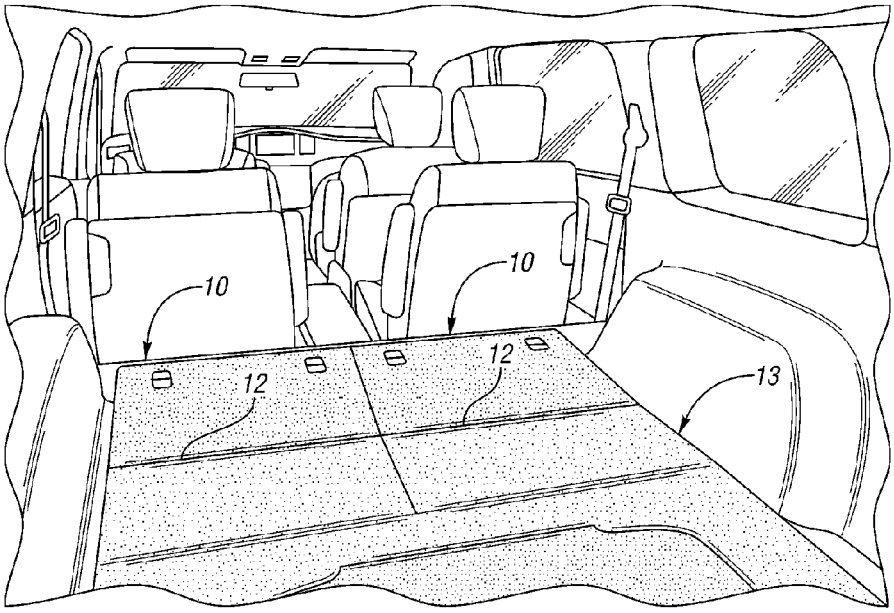
FIG. 5 is an environmental view, partially broken away, showing a pair of carpeted sandwich-type composite panels having living hinges constructed in accordance with at least one method embodiment of the present invention.

Referring now to the FIGS. 5-9, in general, one embodiment of a method of making a sandwich-type composite panel, two of which are generally indicated at 10 in FIG. 5, having a living hinge 12 is provided. The hinged panels 10 are shown in FIG. 5 as forming separate parts of an automotive vehicle load floor, generally indicated at 13. However, it is to be understood that one or more panels 10 constructed in accordance with at least one embodiment of the present invention may be used in a wide variety of environments. The panels 10 in FIG. 5 are shown carpeted but at least one embodiment of the invention does not require such carpeting.

Figure 6:
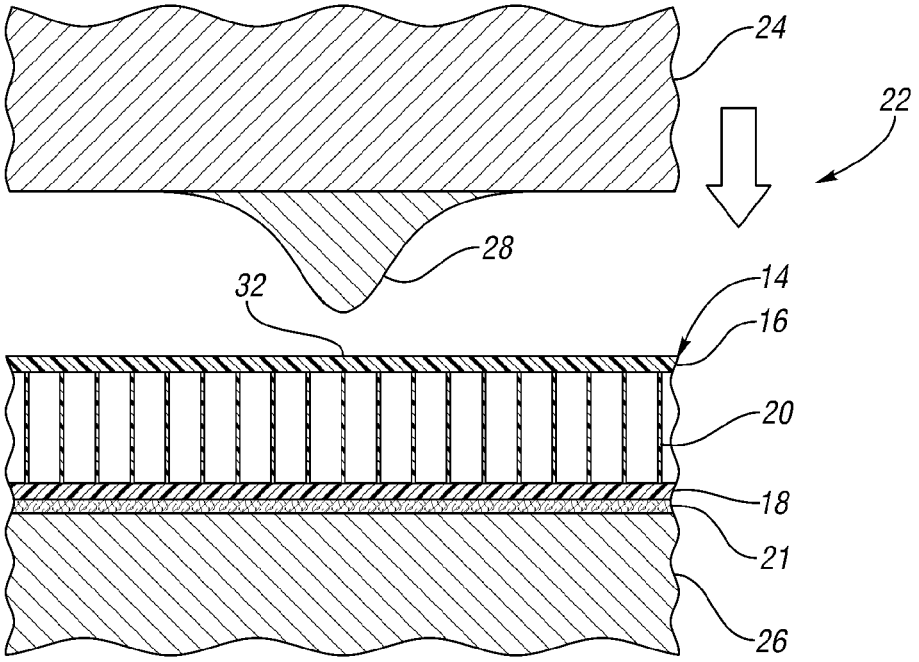
FIG. 6 is a side view, partially broken away and in cross section, of a stack of material positioned between two halves of a mold in its open position wherein one of the mold halves has a protrusion or relief for forming the living hinge of the panel.
Figure 7:
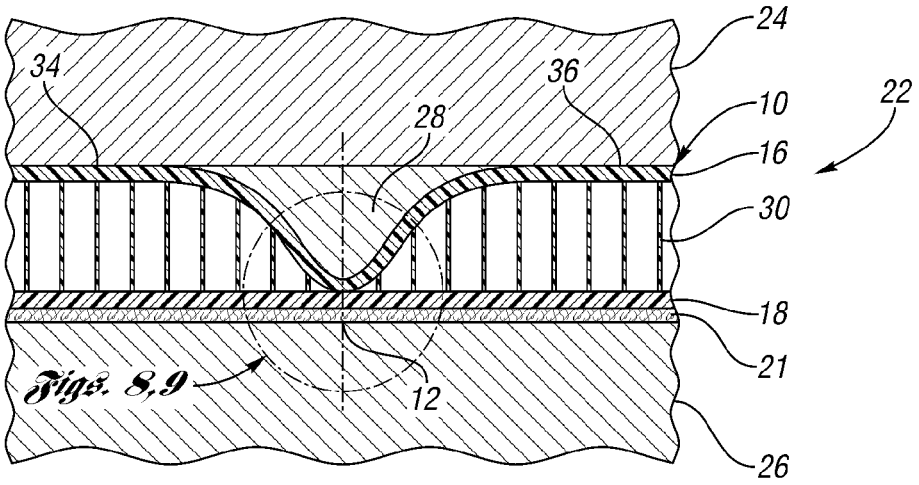
FIG. 7 is a view similar to the view of FIG. 6 but with the mold in its closed position to form the panel and its living hinge in accordance with at least one method embodiment of the invention.
Figure 8:
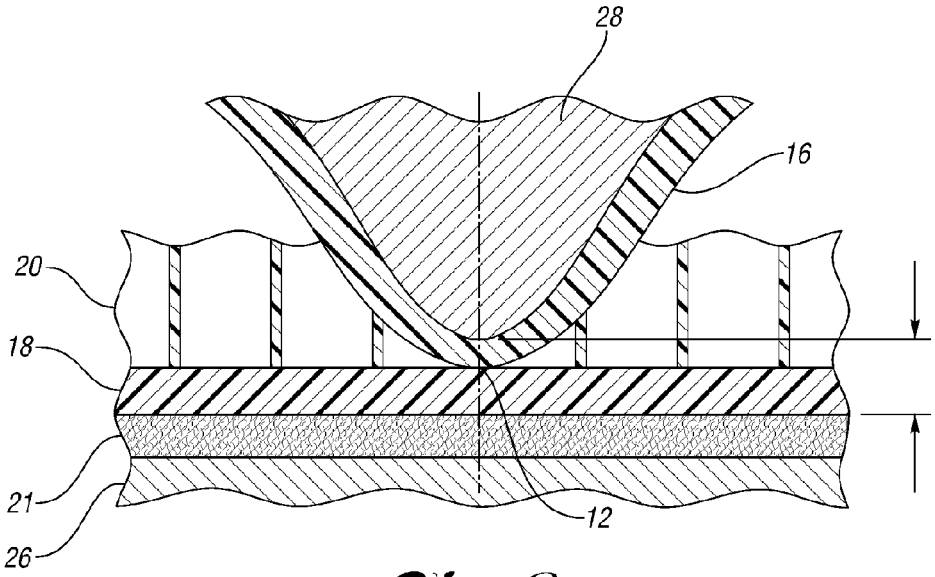
FIG. 8 is an enlarged view of a portion of the view of FIG. 7 to show the living hinge of FIG. 7 in detail.
Figure 9:
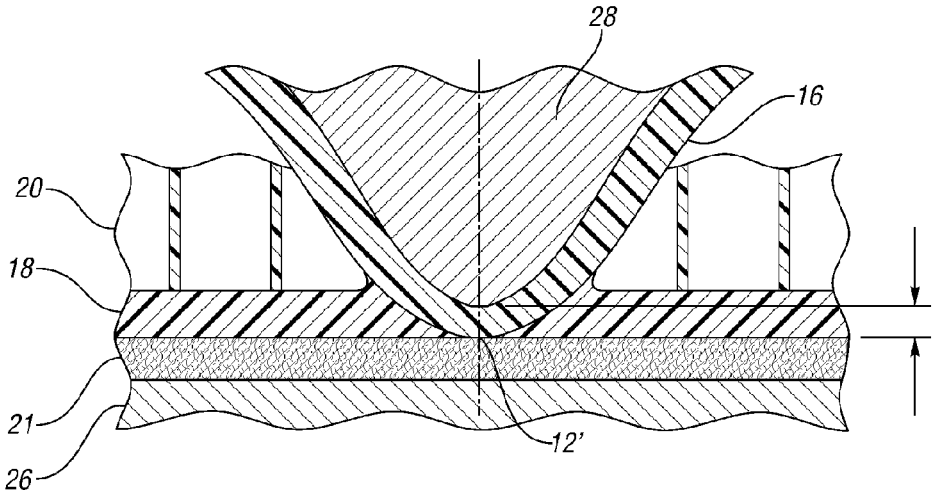
FIG. 9 is an enlarged view, similar to the view of FIG. 8, but showing a second embodiment of a living hinge wherein one of the skins has been pushed into and merged with the other skin to form a living hinge of reduced thickness as compared to the living hinge of FIG. 8.
Figure 10A:
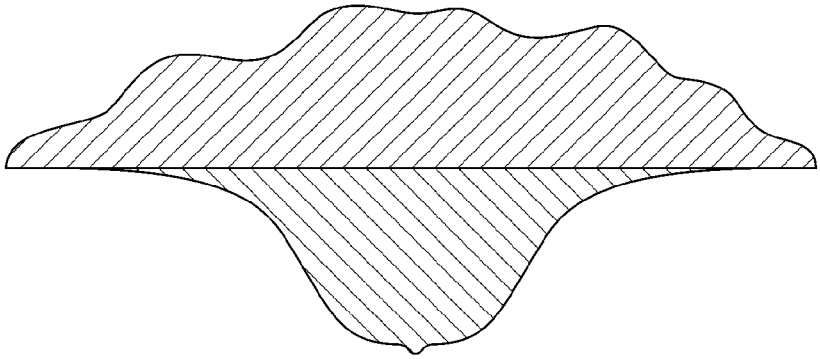
Figure 10B:
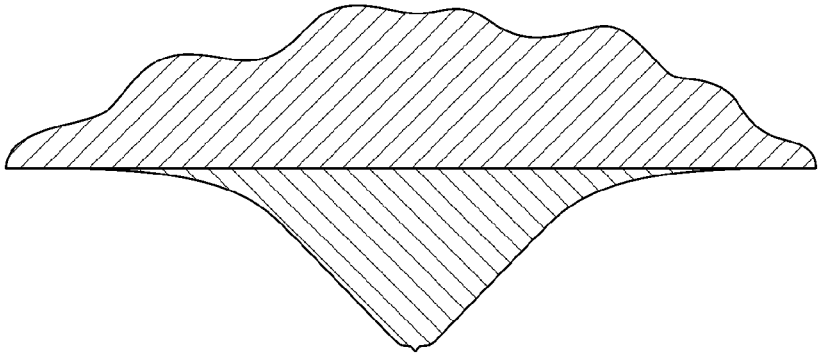
Figure 10C:
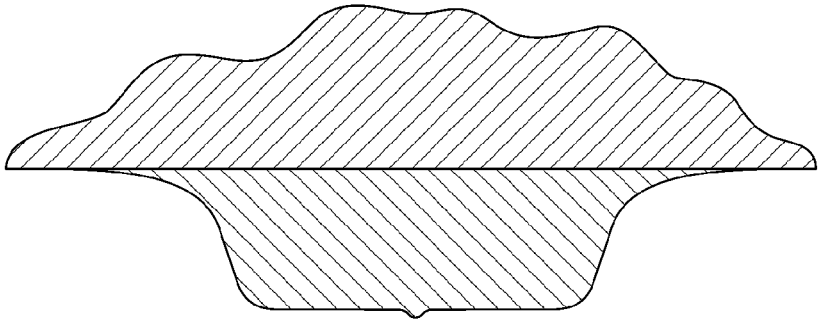
Figure 10B:
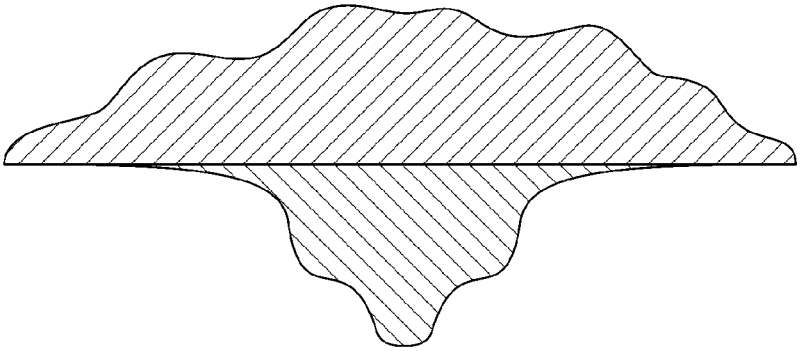
Figure 10C:
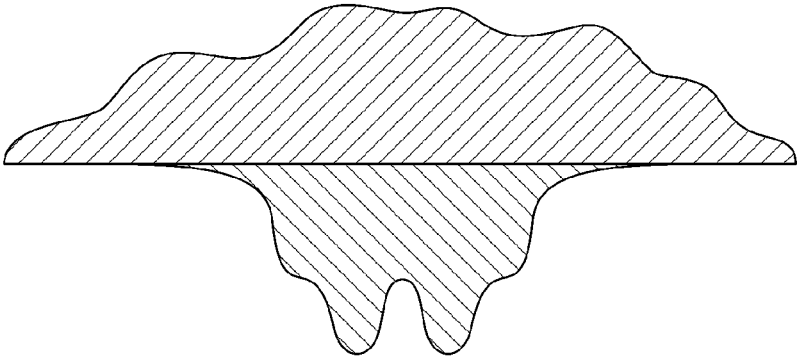
Figure 10F:
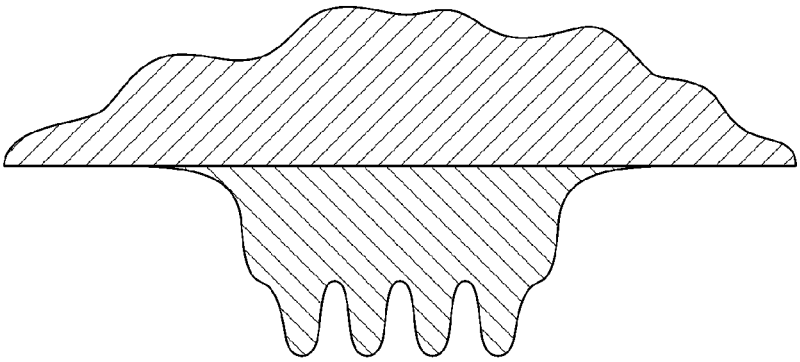

The method may include providing a stack of material, generally indicated at 14 in FIG. 6, located or positioned within a mold, generally indicated at 22. The stack 14 includes first and second reinforced thermoplastic skins 16 and 18, respectively, a thermoplastic cellular core 20 disposed between the skins 16 and 18 and a covering layer of 21 thermoplastics material which covers the second skin 18. The skins 16 and 18 are heated typically outside of the mold 22 to a softening temperature. The mold 22 is preferably a low pressure compression mold which performs a thermo compression process on the stack 14. The mold 22 has an upper mold half or part 24 and a lower mold half or part 26. The upper mold part 24 has a protrusion 28 extending towards the lower mold half 26 for crushing purposes as described in detail below.

The first skin 16 is stretchable when heated to the softening temperature and stretches when a pressure is applied to the stack 14 by the inner mold surfaces of the mold halves 24 and 26 including the outer surface of the protrusion 28 within the mold 22 to form the composite panel 10 with the living hinge 12. A portion 32 of the composite panel 10 (FIG. 6) is crushed at a predetermined location simultaneously with the step of applying the pressure to locally compact and separate the cellular core 20 at the predetermined location to form two side portions 34 and 36 (FIG. 7) of the panel 10 and the crushed portion 32 therebetween. The first skin 16 stretches during the step of crushing while remaining intact between the two side portions 34 and 36. The first and second skins 16 and 18, respectively, of the crushed portion 32 are chemically bonded together to form the living hinge 12 at the predetermined location between the two side portions 34 and 36.

As previously mentioned, the stack 14 of FIG. 6 may also preferably include the thermoplastic covering layer 21 for covering the second skin 18 when making a carpeted panel such as the carpeted panels 10 of FIG. 5. While not shown, the stack 14 may also include a second thermoplastic covering layer for at least partially covering the first skin 16 so that a cover portion of the resulting panel 10 is carpeted on its top and bottom surfaces The covering layer 21 may be a resin carpet and the resin may be polypropylene. One side or both sides of the cover portion of the panel 10 may be covered with an outer covering layer made of a woven or non-woven material (typically of the carpet type).

The cellular core 20 may be a honeycomb core. In this example, the cellular core 20 is an open-celled structure of the type made up of tubes or of a honeycomb, and it is made mainly of polyolefin and preferably of polypropylene. It is also possible to use a cellular structure having closed cells of the foam type.

Each of the skins 16 and 18 may be fiber reinforced. The thermoplastic of the skins 16 and 18, one or more covering layers 21 and the core 20 may be polypropylene. At least one of the skins 16 and 18 may be a woven skin, such as polypropylene skin. The first and second skins 16 and 18 may be reinforced with fibers, e.g., glass fibers, carbon fibers or natural fibers. The first and second skins 16 and 18 may advantageously be made up of woven glass fiber fabric and of a thermoplastics material.

The resulting panel 10 may have a thickness in the range of 5 to 25 mm and the crushed portion of the panel 10 may have a thickness less than 3 mm such as 2 mm or less.

In one example method of making such a panel, the panel 10 is formed by pressing the stack 14 in the low-pressure, cold-forming mold 22, the stack 14 being made up of the first skin 16, the cellular core 20, and the second skin 18. The stack may be pressed at a pressure lying in the range $10\times10^5$ Pa. to $30\times10^5$ Pa. The first and second skins 16 and 18 are preferably pre-heated in the method to make them malleable and stretchable. Advantageously, in order to soften the first and second skins, heat is applied to a pre-assembly constituted by the stack made up of at least the first skin 16, of the cellular core 20, and of the second skin 18 so that, while the panel 10 is being formed in the mold 22, the first and second skins 16 and 18 have a forming temperature lying approximately in the range 160° C. to 200° C., and, in this example, about 180° C.

The protrusion 28 may have other shapes in cross section as shown in FIGS. 10a-10f in order for the mold 22 to perform the crushing step during the pressure application step.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of making a sandwich-type composite panel having a living hinge, the method comprising:

providing a stack including first and second reinforced thermoplastic skins and a [thermoplastic] cellular core disposed between the skins;

heating the skins to a softening temperature wherein the first skin is stretchable when heated to the softening temperature;

applying a pressure to the stack after the step of heating to form the composite panel; and crushing a portion of the composite panel at a predetermined location simultaneously with the step of applying *pressure* to locally compact and separate the cellular core at the predetermined location to form two side portions of the panel and a crushed portion of the panel between the two side portions, the first skin stretching during the step of crushing while remaining intact between the two side portions, the first and second skins at the predetermined location bonding together to form the living hinge between the two side portions.

2. The method as claimed in claim 1, wherein the first and second skins are chemically bonded to each other at the predetermined location to form the living hinge.

3. The method as claimed in claim 1, wherein the stack includes a thermoplastic covering layer for covering the second skin.

4. The method as claimed in claim 3, wherein the covering layer is a resin carpet.

5. The method as claimed in claim 4, wherein the resin is polypropylene.

6. The method as claimed in claim 1, wherein the cellular core is a honeycomb core.

7. The method as claimed in claim 1, wherein each of the skins is fiber reinforced.

8. The method as claimed in claim 1, wherein the thermoplastic of the skins and the core is polypropylene.

9. The method as claimed in claim 1, wherein the panel has a thickness in the range of 5 to 25 mm.

10. The method as claimed in claim 1, wherein at least one of the skins is a woven skin.

11. The method as claimed in claim 1, wherein at least one of the skins is a woven polypropylene skin.

12. The method as claimed in claim 1, wherein the pressure lies in a range including $10\times10^5$ Pa to $30\times10^5$ Pa.

13. The method as claimed in claim 9, wherein the living hinge has a thickness less than 3 mm.

14. The method as claimed in claim 13, wherein the living hinge has a thickness of 2 mm or less.

15. A method of making a carpeted sandwich-type composite panel having a living hinge, the method comprising:

providing a stack including first and second reinforced thermoplastic skins, a [thermoplastic] cellular core disposed between the skins and a thermoplastic covering layer for covering the second skin;

heating the skins to a softening temperature wherein the first skin is stretchable when heated to the softening temperature;

applying a pressure to the stack after the step of heating to form the carpeted composite panel; and crushing a portion of the composite panel at a predetermined location simultaneously with the step of applying *pressure* to locally compact and separate the cellular core at the predetermined location to form two side portions of the panel and a crushed portion of the panel between the two side portions, the first skin stretching during the step of crushing while remaining intact between the two side portions, the covering layer and first and second skins at the predetermined location bonding together to form the living hinge between the two side portions.

16. The method as claimed in claim 15, wherein the covering layer and first and second skins are chemically bonded to each other at the predetermined location to form the living hinge.

17. The method as claimed in claim 15, wherein the thermoplastic of the skins, the covering layer and the core is polypropylene.

18. The method as claimed in claim 15, wherein the living hinge has a thickness less than 3 mm.

* * * * *